United States Patent Office 3,577,513
Patented May 4, 1971

3,577,513
PELLETS FOR SUPPLYING BIOLOGICALLY ACTIVE SUBSTANCES TO RUMINANTS CONTAINING MAGNESIUM AND COATED IRON PARTICLES
Peter Roebuck and Derek James Whitehead, Swinton, Manchester, England, assignors to Pfizer Inc., New York, N.Y.
No Drawing. Filed Dec. 20, 1967, Ser. No. 691,962
Claims priority, application Great Britain, Dec. 21, 1966, 57,219/66
Int. Cl. A61j 3/00, 3/07, 3/08
U.S. Cl. 424—22
4 Claims

ABSTRACT OF THE DISCLOSURE

A pellet for ruminants containing magnesium or magnesium alloy and iron particles, the latter having been treated to form an oxide or other refractory coating thereon.

This invention relates to pellets for supplying predetermined quantities of biologically active substances, e.g. nutritional or therapeutic substances, to ruminants over an extended period of time. The pellets are administered to the animal in such a manner that they remain in the rumeno-reticular sac where it is intended that they should slowly dissolve or corrode and thus supply to the alimentary tract a continuous quantity of the nutritious or therapeutic substance.

An object of this invention is to provide a suitable magnesium-containing pellet for preventing a disease known as hypomagnasaemia caused by magnesium deficiency in the diet of cattle and sheep.

In order that the pellets, once introduced into the rumeno-reticular sac, remain there for a considerable period it is necessary that the pellet be of a specific gravity not less than 2.2.

It has been suggested that the specific gravity of the pellets be adapted for the present purpose by the provision of solid steel cores. However, this was thought undesirable since the steel cores would remain in the animal long after the magnesium had dissolved.

Therefore, the pellets should be such that they remain in the animal for an extended period of time and yet are finally entirely passed into the alimentary tract.

A further requirement is that of providing a constant rate of dissolution or emission of the biologically active substance during this extended period. Pellets have been provided hitherto comprising mixtures of materials such as copper oxide and clay, or cobaltic oxide and clay, but these were found not to be entirely satisfactory in that after a while the surface of the pellets became partially or completely sealed by an insoluble film from the fluid in the rumeno-reticular sac.

According to the invention described in the specification of our British patent application No. 48,589 of 1964, now Pat. No. 1,102,979, we provide a pellet for administration to ruminants, for retention in the rumeno-reticular sac, for supplying the animals with biologically active substances over an extended period of time, said pellet having at least magnesium or magnesium base alloy as the biologically active substance and having a particulate substance of higher specific gravity than that of the magnesium or magnesium alloy, said biologically active substance and particulate substance being in such proportions that the pellet has a specific gravity of at least 2.2.

The particulate material may be from 0.02 mm. to 0.07 mm. average diameter and is preferably iron shot. Experiments have shown that while this is often satisfactory it is found that in a proportion of the animals the pellets dissolve in too short a period to be convenient. We have ascertained that this is due at least partly to a close association between the magnesium and the iron shot so that apparently a galvanic action occurs whereby the magnesium is rapidly dissolved.

According to the present invention the iron (herein intended to include steel) is treated to form a refractory coating on it before being incorporated in the magnesium.

The preferred method of coating the iron shot is by heating it to about 600 to 800° C. or more in air so that it becomes coated with a dark coloured iron oxide coating. It is then (while hot or after cooling) mixed with or incorporated in magnesium or magnesium alloy by any of the methods described in said prior specification.

For example the iron shot may be mixed with magnesium alloy at a temperature between the liquidus and solidus temperatures of the alloy so that the mixture is in a more or less pasty condition. A quantity of the mixture is ladled out and injected into a closed die to form it to the required shape or it may be introduced into an open die.

The iron shot may be coated with rust but precautions must then be taken to avoid sticking of the shot together as a mass. A still further alternative method is to coat the shot particles with a coating such as a mould wash as used for coating moulds before casting magnesium alloy into them. Another treatment could be a phosphate treatment of the iron shot by any known phosphate process.

The coating must be sufficiently refractory and/or adherent to withstand the subsequent heat and/or shaping treatment.

A suitable mixture may be 35 to 50% iron shot by weight (e.g. 43 to 44 percent) remainder magnesium alloy. For sheep a pellet weighing about 30 to 40 grams is desirable, e.g. 35 grams, and for cattle pellets of 80 to 120 grams is desirable, e.g. 100 grams.

The specific gravity of the pellet should be at least 2.2 preferably at least 2.5. The average diameter of the pellets preferably is in the range of 0.02 to 0.07 mm.

The pellet may contain other ingredients as specified in our aforesaid prior specification. For example the magnesium alloy may contain 10–14 percent aluminium and 1 to 3 percent copper, e.g. 12% aluminium and 2 percent copper, by weight of magnesium alloy.

We claim:
1. A pellet for administration to ruminants, for retention in the rumeno-reticular sac, for supplying the animals with biologically active substances over an extended period of time, the biologically active substance being selected from the group consisting of magnesium and magnesium alloys, said substance having incorporated therewith particles of iron or steel, each said particle having a coating of iron oxide and the proportion of iron or steel in each pellet being such that the specific gravity of the pellet is at least 2.2.

2. A pellet as claimed in claim 1 wherein the size of the particles is from .02 mm. to .07 mm. average diameter.

3. A pellet according to claim 1 in which the iron is present in an amount of 35% to 50% by weight.

4. A pellet according to claim 1 wherein the magnesium alloy contains 10% to 14% Al and 1% to 3% Cu by weight of said alloy.

References Cited

UNITED STATES PATENTS 3,056,724   9/1958   Marston _____ 424—22

FOREIGN PATENTS 673,067   3/1966   Belgium.

OTHER REFERENCES

Veterinary Bulletin, #2276, 1961.
Merck Index, Merck and Co. Inc. Rahway, N.J., 1960, p. 625.

SAM ROSEN, Primary Examiner

U.S. Cl. X.R.

424—19, 154, 147